United States Patent
Varma et al.

(10) Patent No.: US 7,861,095 B2
(45) Date of Patent: Dec. 28, 2010

(54) DATA PROCESSING APPARATUS SECURITY

(75) Inventors: Rahoul Kumar Varma, Berkshire (GB); Marc Richard Wicks, Surrey (GB); Gareth Duncan, Berkshire (GB); David Francis McHale, Harrow (GB); Mike Livesley, Berkshire (GB)

(73) Assignee: ARM Limited, Cambridge (GB)

( * ) Notice: Subject to any disclaimer, the term of this patent is extended or adjusted under 35 U.S.C. 154(b) by 837 days.

(21) Appl. No.: 11/057,373

(22) Filed: Feb. 15, 2005

(65) Prior Publication Data

US 2006/0184804 A1    Aug. 17, 2006

(51) Int. Cl.
*G06F 12/14* (2006.01)

(52) U.S. Cl. ...................................... 713/193
(58) Field of Classification Search ................. 713/193
See application file for complete search history.

(56) References Cited

U.S. PATENT DOCUMENTS

| | | | | |
|---|---|---|---|---|
| 4,089,052 A * | 5/1978 | Gruner | ...................... | 711/167 |
| 5,218,688 A * | 6/1993 | Nishida | ...................... | 711/151 |
| 6,523,118 B1 * | 2/2003 | Buer | ...................... | 713/189 |
| 2002/0065866 A1 * | 5/2002 | Sueyoshi | ..................... | 709/102 |
| 2002/0133608 A1 * | 9/2002 | Godwin et al. | .............. | 709/230 |
| 2003/0159056 A1 * | 8/2003 | Cromer et al. | .............. | 713/193 |
| 2004/0105298 A1 * | 6/2004 | Symes | ........................ | 365/149 |
| 2004/0143720 A1 * | 7/2004 | Mansell et al. | ............. | 711/206 |
| 2006/0020745 A1 * | 1/2006 | Conley et al. | ............... | 711/103 |
| 2006/0021035 A1 * | 1/2006 | Conti et al. | ................... | 726/22 |
| 2006/0080553 A1 * | 4/2006 | Hall | ........................... | 713/189 |

\* cited by examiner

*Primary Examiner*—Nasser Moazzami
*Assistant Examiner*—Michael S McNally
(74) *Attorney, Agent, or Firm*—Nixon & Vanderhye P.C.

(57) ABSTRACT

A data processing apparatus is provided, which is operable to access data values associated with a respective address values. The data processing apparatus has: a processor; a main memory having a secure data values region; a cache; and cache interface logic having data transaction logic and security determination logic. The data transaction logic receives from the processor a data access request for accessing data in cache. The data access request has an associated address value and a security attribute. If the security attribute indicates that the request is a non-secure data-access request, the security determination logic determines, via a data region allocation table, whether the request is associated with the secure data values region of main memory and the non-secure data access request is allowed to complete if it is not associated with the secure data region.

19 Claims, 4 Drawing Sheets

DATA PROCESSING APPARATUS SECURITY

TECHNICAL FIELD

The present invention relates to data processing apparatus security. Embodiments of the present invention relate to a data processing apparatus operable to perform a data access dependent on security attributes associated with that data access.

BACKGROUND

It is becoming increasingly important in data processing systems to provide techniques for handling secure and non-secure data. Such techniques often seek to restrict the circumstances under which secure data may be accessed and manipulated. However, whilst many safeguards often exist to protect the integrity of secure data, weaknesses in the techniques employed may invariably still exist which may circumvent the safeguards provided and may compromise the integrity of secure data.

Accordingly, it is desired to provide a technique which assists in maintaining the integrity of secure data.

SUMMARY

The inventors recognized that even when operating with strict security safeguards, a possibility exists whereby secure data may become inadvertently accessible using, for example, a non-secure data transaction. Being able to access secure data using non-secure data transactions may occur for a variety of reasons. For example, once a data value has been retrieved from a main or level three memory, that data value may be assumed to be freely accessible to a level one processor core either from a level two cache directly or via a level one cache, as required, until that data value is evicted from the caches. When accessing a data value from the main memory, any necessary security checks would have been performed to ensure that the access did not contravene any security safeguards. Hence, it would seem reasonable to assume that once a data value has been validly retrieved from main memory and stored in a cache then that data value should be available to the processor since the processor clearly would have had the necessary security authorisations to access that data value. Furthermore, when writing data values from the level one core, the level two cache will normally provide an early response to the level one core which assumes that the write will not contravene any of the security safeguards, in order that the performance of the level one core can be maintained.

However, the inventors recognized that a problem with such an approach is that it may be possible, either through unexpected behaviour of the data processing system or through deliberate or malicious coding, to circumvent any security safeguards provided and access secure data stored in the level two cache using a non-secure data transaction. For example, it may be possible to cause the level one core operating in a secure mode to access secure data in the level two cache. If the level one core can then be caused to switch from the secure to a non-secure mode, then it may be possible to access the secure data values stored in the level two cache, either directly or via a level one cache, using a non-secure access from a non-secure application.

According to one aspect, a data processing apparatus is operable to access data values, each data value being associated with a respective address value, the data processing apparatus comprising: a processor operable to process an instruction which causes a data access request; a main memory operable to store data values, the main memory having a region of secure data values; a cache operable to store previously accessed data values; and cache interface logic comprising: data transaction logic operable to receive a data access request from the processor requesting a data value be accessed in the cache, the data access request having an address value and a security attribute associated therewith; and security determination logic operable, in the event that the security attribute indicates a non-secure data access request, to determine whether the non-secure data access request is associated with the region of secure data values by interrogating a data region allocation table and, in the event that the data region allocation table provides an indication that the address value is not associated with the secure data region, to enable the data access request to complete.

Accordingly, data transaction logic is provided which receives data access requests from the processor. Each data access request has an address value and a security attribute. The security attribute may indicate that the data access request is a non-secure data access request. Security determination logic is also provided. The security determination logic determines whether the security attribute indicates that a non-secure data access request has been received. In the event that the security attribute indicates a non-secure data access request, the security determination logic determines whether the address value is associated with a region of secure data. This determination is made by interrogating a data region allocation table. Should the data region allocation table indicate that the address value is not associated with the secure data region, then the security determination logic enables the data access request to complete.

By determining whether the non-secure data access request is not associated with the region of secure data, it is possible to ensure that no non-secure data accesses occur for address values within a secure region. Such an approach reduces the risk that a non-secure data access can be performed to access a secure data value having an address value falling within the secure region.

Hence, even if it were possible to cause the processor to switch from a secure mode to a non-secure mode, it would not be possible to access secure data values stored in the cache using a non-secure access from, for example, a non-secure application.

In embodiments, the security determination logic is operable to prevent the data access request from completing whilst the security determination logic determines whether the non-secure data access request is associated with the region of secure data values.

Preventing the data access from completing until it is confirmed that the non-secure data access is associated with a non-secure data value further helps to ensure that non-secure data accesses can not be used to access secure data values.

In embodiments, the security determination logic is operable to signal the processor to indicate that a data access is outstanding in order to prevent the processor from receiving a response for the access whilst the security determination logic determines whether the non-secure data access request is associated with the region of secure data values.

Preventing the processor from receiving a response for the access until it is confirmed that the non-secure data access is associated with a non-secure data value further helps to ensure that non-secure data accesses can not be used to access secure data values.

In embodiments, the data access request is a request to write data to the cache and the security determination logic is operable, in the event that the security attribute indicates a non-secure write request, to determine whether the non-secure write request is associated with the region of secure data values and, in the event that the data region allocation table provides an indication that the address value is not associated with the region of secure data values, to enable the write request to complete.

Accordingly, only when it is determined that the non-secure write request is associated with a region of non-secure data will the cache enable the write request to complete. By this approach it can be ensured that a non-secure write request can not be used to write secure data to the cache.

In embodiments, each data value is further associated with a security state indication and the security determination logic is further operable, in the event that the data region allocation table provides an indication that the address value is not associated with the region of secure data values, to set the security state indication associated with each data value the subject of the write request to indicate the data as being non-secure data values.

Hence, the security state indication is set to indicate non-secure data whenever a data value associated with the non-secure data region is written to the cache.

In embodiments, the data access request is a request to write data to the cache, each data value is further associated with a security state indication and the security determination logic is operable, in the event that the security attribute indicates a secure write request to enable the write request to complete and to set the security state indication associated with each data value the subject of the write request to indicate the data as being secure data values.

Hence, the security state indication is set to indicate secure data whenever a data value associated with the secure data region is written to the cache.

In embodiments, each data value is further associated with a security state indication and the cache is operable to store the security state indication associated with each data value.

Accordingly, the cache itself may be arranged to store the security state indication.

In embodiments, the security determination logic is operable, in the event that the security attribute indicates a non-secure write request, to determine whether the non-secure write request is associated with the region of secure data values and, in the event that the data region allocation table provides an indication that the address value is associated with the region of secure data values, to prevent the write request from completing.

Preventing the write request from completing ensures that secure data can not be written using a non-secure write request.

In embodiments, the security determination logic is operable to prevent the data access from completing by signalling the processor to abort.

Causing the processor to abort or to initiate an abort routine disrupts the operation of the data processing apparatus when secure data is attempted to be written using a non-secure write request. Typically, causing the processor to abort will result in a system reset which gates data stored in the cache from being allocated thereby preventing secure data from being written using a non-secure write request.

In embodiments, the security determination logic is operable to determine whether the address value is associated with the region of secure data values by providing a level three memory with the address value and the security attribute, the level three memory being operable to maintain the data region allocation table and to provide an indication of whether the address value is accessible with using a data access request having that security attribute.

Hence, the determination can be made simply by reference to the level three memory.

In embodiments, the level three memory is operable to maintain the data region allocation table to indicate those data regions accessible using secure and non-secure data access requests.

In embodiments, the security determination logic is operable to determine whether the non-secure data access request is associated with the region of secure data values by initiating a data access to the level three memory and providing the address value and the security attribute.

In embodiments, the data access comprises one of a read and a write to the level three memory.

In embodiments, the data access comprises a linefill read from the level three memory.

In embodiments, the level three memory is operable to provide an access confirmation signal when the non-secure data access request is not associated with the region of secure data values and an access error signal when the non-secure data access request is associated with the region of secure data values.

In embodiments, the data processing apparatus further comprises the data region allocation table operable to provide an indication of whether the address value is accessible with using a data access request having that security attribute.

In embodiments, the cache interface logic further comprises the data region allocation table operable to provide an indication of whether the address value is accessible with using a data access request having that security attribute.

In embodiments, the data processing apparatus further comprises a level one cache and the cache is a level two cache.

Another aspect provides a data processing apparatus for accessing data values, each data value being associated with a respective address value, the data processing apparatus comprising: means for processing an instruction which causes a data access request; means for storing data values, the means for storing having a region of secure data values; cache means for storing previously accessed data values; and cache interface means comprising: means for receiving a data access request from the means for processing, the data access request requesting a data value be accessed in the cache means, the data access request having an address value and a security attribute associated therewith; and means for determining, in the event that the security attribute indicates a non-secure data access request, whether the non-secure data access request is associated with the region of secure data values by interrogating data region allocation means and, in the event that the data region allocation means provides an indication that the address value is not associated with the secure data region, for enabling the data access request to complete.

A further aspect provides a method of accessing data values in data processing apparatus, each data value being associated with a respective address value, the data processing apparatus comprising a processor operable to process an instruction which causes a data access request, a main memory operable to store data values, the main memory having a region of secure data values and a cache operable to store previously accessed data values, the method comprising the steps of: receiving a data access request from the processor requesting a data value be accessed in the cache, the data access request having an address value and a security attribute associated therewith; in the event that the security attribute indicates a non-secure data access request, determining whether the non-secure data access request is associated with the region of secure data values by interrogating a data region allocation table; and in the event that the data region allocation table provides an indication that the address value is not associated with the secure data region, enabling the data access request to complete.

Another aspect provides a data processing apparatus operable to access data values, each data value being associated with a respective address value, the data processing apparatus comprising: a processor operable to process an instruction which causes a data access request, each data access request having an address value and a security mode indication associated therewith; and a cache operable to store data values together with associated security attributes at corresponding address value locations, the cache being further operable on receipt of a data access request to determine whether a data value having that address value and security attribute corresponding to the security mode indication is accessible in the cache and, if so, to indicate to the processor that the data value is available.

In embodiments, the cache is operable to indicate to the processor that the data value is not available when it is determined that a data value having that address value and security attribute corresponding to the security mode indication is not accessible in the cache.

In embodiments, the security attribute indicates whether the data value is one of a secure and non-secure data value and the security mode indication indicates that the processor is in one of a secure and non-secure mode.

In embodiments, the cache comprises a data RAM operable to store data values and a tag RAM, and the security attribute comprises one or more bits of each tag entry in the tag RAM.

In embodiments, the cache is a level two cache.

A further aspect provides a method of accessing data values in data processing apparatus, each data value being associated with a respective address value, the data processing apparatus comprising a processor operable to process an instruction which causes a data access request and a cache operable to store data values together with associated security attributes at corresponding address value locations, the method comprising the steps of: receiving a data access request having an address value and a security mode indication associated therewith; and determining whether a data value having that address value and security attribute corresponding to the security mode indication is accessible in the cache and, if so, indicating to the processor that the data value is available.

DETAILED DESCRIPTION OF EXAMPLE EMBODIMENTS

Figure 1:
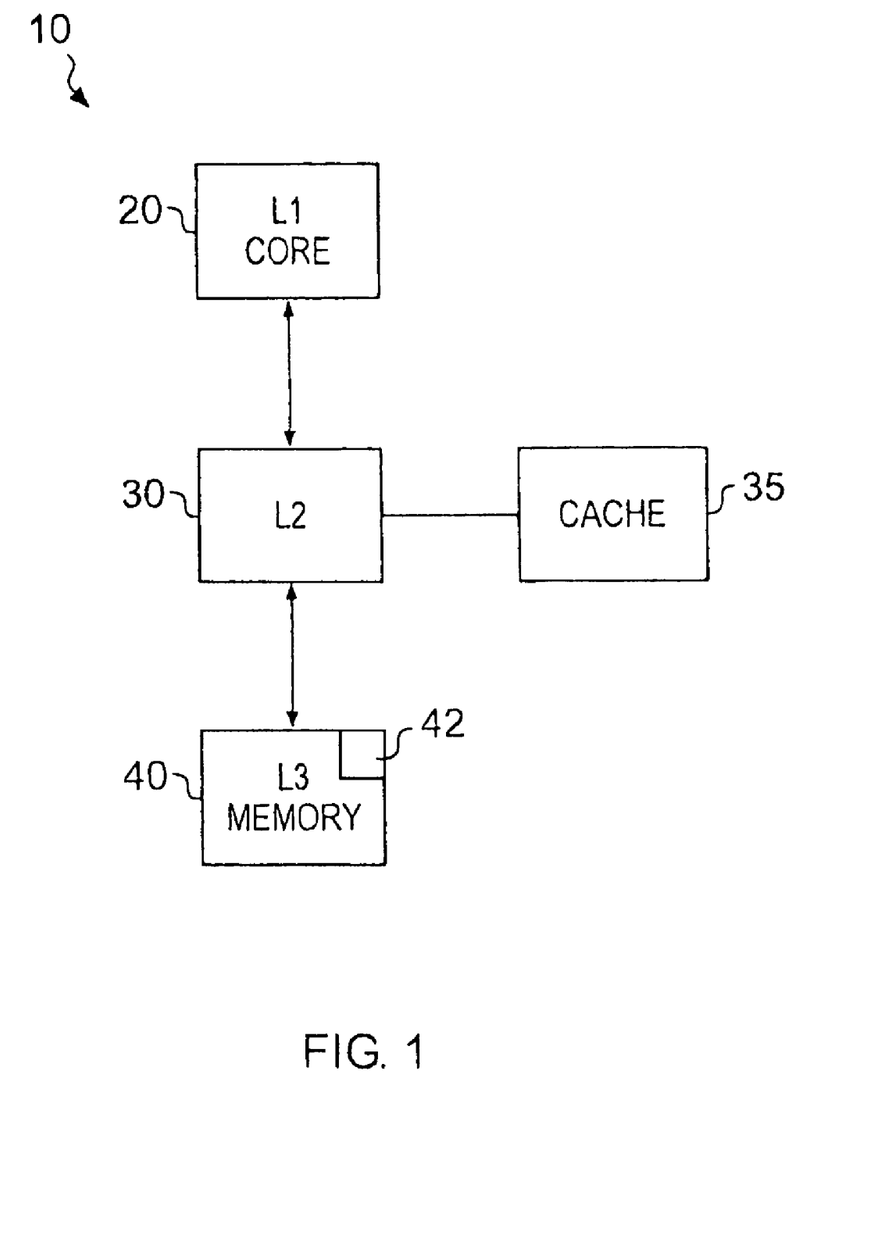
FIG. 1 illustrates a data processing system according to an example embodiment.

FIG. 1 illustrates a data processing system according to an embodiment. The data processing system, generally 10, comprises a level 1 processor core 20. Coupled with the level 1 processor core 20 is a level 2 memory 30 having a cache 35 and a level three memory 40.

The level 1 processor core 20 is operable to execute a sequence of instructions that are applied to data values supplied to the processor core 20. Instructions and data to be processed by the processor core 20 are stored in the level three memory 40. Hereafter, the term data value will be used to refer to both instructions and data.

The level 2 memory 30 includes the cache 35 arranged to store data values so that they are subsequently readily accessible by the processor core 20 using a reduced number of access cycles when compared to an equivalent access to the level three memory 40. The cache 35 stores a data value associated with a memory address until it is overwritten by a data value for a new memory address required by the level 1 core 20. The data value is stored in the cache 35 using either physical or virtual memory addresses. Should the data value in the cache 35 be altered then it is usual to ensure that the altered data value is rewritten to the level three memory 40, either at the time the data value is altered or when the data value in the cache 35 is overwritten (as will be explained in more detail below).

The level 1 processor core 20, level 2 memory 30 and the level three memory 40 are coupled to each other using an AXI protocol bus. The level three memory 40 is a slave to the level 2 memory 30 master. The level 2 memory 30 is a slave to the level 1 core 20 master. Under the AXI protocol, each master is able to have only a finite number of outstanding data transfer requests with a slave. A master port in each master indicates when there is an outstanding data transfer request with a slave. Should logic within the master port indicate that the number of outstanding data transfer requests exceeds the maximum then that master is prevented from initiating further data transfers requests until the outstanding data transfer request has completed.

The level 1 processor core 20 can support a number of operating modes. Two such operating modes are a secure operating mode and a non-secure operating mode. The memory address space accessed by the level 1 processor core 20 is designated as secure memory and non-secure memory regions. When operating in the secure mode, both secure and non-secure memory regions should be accessible. However, when operating in the non-secure mode, only non-secure memory should be accessible.

The AXI protocol utilises a number of buses which are used to transmit data values, address values and control signals between masters and slaves. One control signal is a so-called "prot[1]" signal which provides an indication to the slave of whether the level 1 processor core 20 is requesting a secure or a non-secure data access. When the prot[1] signal is asserted, this indicates that the level 1 processor core 20 is requesting a non-secure data access. When the prot[1] signal is cleared, this indicates that the level 1 processor core 20 is requesting a secure data access. The prot[1] signal is propagated from master to slave, from master to slave, and so on, along with any data transfer request. Another control signal is a so-called "response" signal which provides an indication to the master of whether a slave was able to process a data transfer request. When the response signal is cleared (i.e. an OK signal is generated), this indicates that the slave was able to process the data transfer request. When the response signal is asserted (i.e. a so-called decode error (decerr) signal is generated), this indicates that the slave was unable to process the data transfer request because a security violation, or because an address value does not exist.

The level three memory 40 maintains page tables (not shown) which associate regions of memory with being secure or non-secure data regions. Secure data regions are provided to protect data values by ensuring that only secure accesses being requested by the level 1 processor core 20 in the secure mode are able to access those data values. Should the level three memory 40 receive a request to perform a data transfer then the address of the data value associated with that data transfer, together with the prot[1] signal (which provides an indication of whether the level 1 core 20 is making a secure or a non-secure request) is provided to the level three memory 40. The page tables are referred to in order to determine whether that data value can be accessed with that access request. In the event that it is determined that the data value can be accessed in with that access request then a response signal (the OK signal) is provided indicating that the data value can be accessed and the data value is provided. However, in the event that it is determined that the data value can not be accessed with that access request then a response signal (the decode error (decerr) signal) is provided indicating that the data value can be not accessed and the data value is not provided. The decerr signal is propagated back to the level 1 core 20 to indicate that a security violation has occurred and this causes the level 1 core 20 to abort. The abort may be caused by executing an abort routine which results in a denial of service.

Hence, the level three memory has safeguards which prevent a security violation from occurring when data is accessed.

Security safeguards are also provided in the level 2 memory 30 and the cache 35 as will be described in more detail below. These safeguards help to ensure that security violations can not occur with data values stored in the cache 35. It will be appreciated that such security violations can be a particular issue where the level 2 memory 30 and the cache 35 serve multiple master level 1 cores 20.

Essentially, two separate techniques are provided for ensuring the security integrity of data values stored in the cache 35.

The first technique relies on a security check being made with the level three memory 40 prior to any data value being written to the cache 35 to ensure that that data value can be written when the level 1 core 20 is operating in its current mode of operation, using that particular access request. The level 1 core 20 is prevented from receiving a response until it has been determined that the outstanding data transfer request is valid and can be completed. Whilst this technique slows the operation of the level 1 core 20, it will be appreciated that this provides an increased assurance that no security violation is taking place.

The second technique helps to speed the security check process by maintaining an indication in the cache 35 of whether each data value (or cache line of data values) is associated with the secure or non-secure data regions. Whilst this increases the speed of operation of the level 1 core 20 (since no access to the slower level three memory need take place), this is at the cost of requiring additional information to be stored in the cache 35.

Both of these techniques help to prevent security violations of data values accessed at level 2 and will now be described in more detail below with reference to FIGS. 2, 3 and 4.

Figure 2:
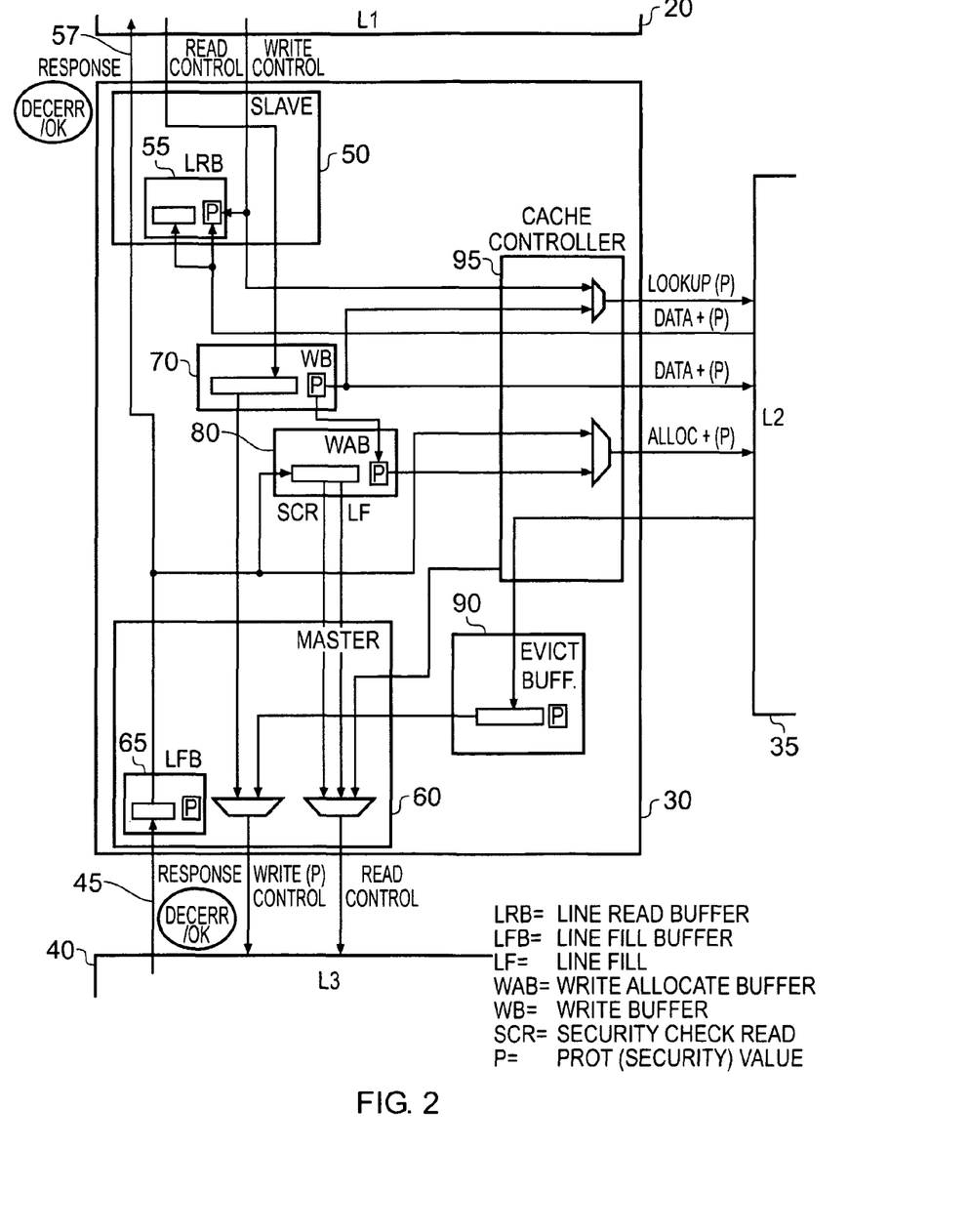
FIG. 2 illustrates in more detail the arrangement of the level 2 memory system shown in FIG. 1.

FIG. 2 illustrates in more detail the arrangement of the level 2 memory 30 and cache 35 shown in FIG. 1. The level 2 memory 30 is a slave device to the level 1 core 20 and receives control signals, addresses and data values via a slave port 50. The level three memory 40 is a slave device to the level 2 memory 30 and receives control signals, addresses and data values from a master port 60.

The level 2 memory 30 has a write buffer 70, a write allocate buffer 80, an eviction buffer 90 and a controller 95. The write buffer 70 is used to receive a complete cache line of data values for storing to the cache 35. The write allocation buffer 80 is used in the event that a complete cache line is not provided and retrieves any missing data values prior to storing these in the cache 35. The eviction buffer 90 is used to store a cache line of data values which may have been evicted from the cache 35 for whatever reason prior to that cache line being written to the level three memory 40. The controller 95 couples the appropriate components of the level 2 memory 30 with the cache 35 in order to perform the required data transfer operations.

When a read data request is initiated by the level 1 core 20 and a cache miss occurs in the cache 35, then the level three memory 40 will be provided with details of the address value of the data value to be read, together with the prot[1] signal indicating the security mode of the access request from the level 1 processor core 20 in order to perform a security check. In the event that the level three memory 40 determines that that data value falls within a region which may be accessed with that access request then the data value together with other data values to make a single cache line are returned to the master port 60 and stored in the line fill buffer 65, together with a security attribute indicating whether the data values are secure or non-secure. Thereafter, the contents of the line fill buffer 65 are provided to the level 1 core 20 and also, if required, stored in the cache 35. As will be explained in more detail below with reference to FIG. 3, the security attribute may also be stored in the cache 35 to indicate whether the data values are secure or non-secure. In the event that the level three memory 40 determines that that data value falls within a region which may not be accessed with that access request then the data value is not returned and the decerr signal is returned via the master port 60 to the slave port 50 and onto the level 1 core 20 in order to cause the level 1 core 20 to abort.

When a read data request is initiated by the level 1 core 20 and a cache hit occurs in the cache 35, then the data value together with other data values to make a single cache line are returned to the slave port 50 and stored in the line read buffer 55, together with a security attribute indicating whether the data values are secure or non-secure. Thereafter the contents of the line read buffer 55 are provided to the level 1 core 20. As will be described in more detail below with reference to FIG. 3, for embodiments which store the security attribute in the cache 35, a hit will only occur for secure data values when requesting with a secure access and a hit will only occur for non-secure data values when requesting with a non-secure access.

When a write data access occurs, the level 1 processor core 20 will provide data values, address values and control values to the slave port 50.

The data values are initially written to the write buffer 70. The write buffer 70 stores multiple words. For example, the write buffer may be arranged to store 4 64-bit words, which correspond to a 256-bit cache line of the cache 35. Hence, the write buffer 70 may receive multiple data words over multiple processing cycles for storage therein. Also, the status of the prot[1] signal is captured and stored by the write buffer 70 to provide an indication of the security access of the level 1 core 20 when performing the data transfer. For example, in the event that the prot[1] signal is asserted this may indicate that the level 1 core 20 is operating with a non-secure access, whereas if this signal is cleared then this will indicate that the level 1 core 20 is operating with a secure access.

Once the write buffer 70 has been filled with a complete cache line of data, the write buffer 70 will initiate a read data access to the level three memory 40 as a security check. The read data access will provide the level three memory with an address value of the data value stored in the write buffer 70, together with an indication of the prot[1] signal. The level three memory 40 will attempt to read data from the address value specified in conjunction with the propagated value of the prot[1] signal and will respond thereafter.

In the event that the level three memory 40 indicates that the data stored at the address value provided can be accessed with that access request then the OK signal indicating that such a data transaction can occur will be propagated over the path 45 to the master port 60. Thereafter, the data values provided by the level three memory 40 will be discarded and the data values stored in the write buffer 70 will be provided together with the security attribute to the cache 35 which will store the cache line of data values at the appropriate locations in the cache 35.

In the event that the level three memory 40 determines that the data transaction should not occur then the decerr signal will be provided over the path 45. The master port 60 will in turn will propagate the decerr signal over the path 57 from the slave port 50 to the level 1 processor core 20.

Accordingly, in the event that a non-secure data access is determined to relate to a secure region of memory then the decerr error signal is propagated back to the level 1 core 20 which causes the operation of the level 1 core 20 to abort. However, in the event that the data transaction is determined to be allowable then the OK signal is propagated back to the level 1 core 20. This in turn clears an indication stored in the master port of the level 1 core 20 that that transaction is outstanding.

Should the writing of any data values to the cache 35 require the eviction of any data values from the cache 35 then the evicted data together with an indication of its security attributes is provided to the eviction buffer 90 for subsequent writing to the level three memory 40.

In the event that the data values provided by level 1 core 20 does not comprise a complete cache line of data values then the data values are passed from the write buffer 70 to the write allocation buffer 80.

The write allocation buffer 80 then initiates a read data access from the level three memory 40 to obtain the missing data values to complete the cache line. When initiating the read data access from the level three memory 40, details of the address values associated with that cache line and the security attribute are passed to the level three memory 40. The level three memory 40 will then attempt to cause a read data access of the specified data values, this also serves to perform a security check.

As before, in the event that the level three memory 40 indicates that the data value stored at the address value provided can be accessed when the level 1 core 20 is operating in that mode then the OK signal indicating that such a data transaction can occur will be propagated over the path 45 to the master port 60. Thereafter, the data values provided by the level three memory 40 will be added to the data values stored in the write allocation buffer 80 and provided together with the security attribute to the cache 35 which will store the cache line of data values at the appropriate locations in the cache 35.

In the event that the level three memory 40 determines that the data transaction should not occur then the decerr signal will be provided over the path 45. The master port 60 will in turn will propagate the decerr signal over the path 55 from the slave port 50 to the level 1 core 20.

Whilst the security check has been illustrated with reference to accesses to the level three memory 40, it will be appreciated that page tables containing information relating to the secure and non-secure memory regions could be provided at level 2. These tables could then be referred to when performing the security check. Providing the tables at level 2 would clearly increase the speed of performing the security check. However, this would be at the cost of an increased size of infrastructure required at level 2. In order to further increase the integrity of the security check, the page tables whether at level 2 or level three can only be written to using secure data transactions.

Figure 3:
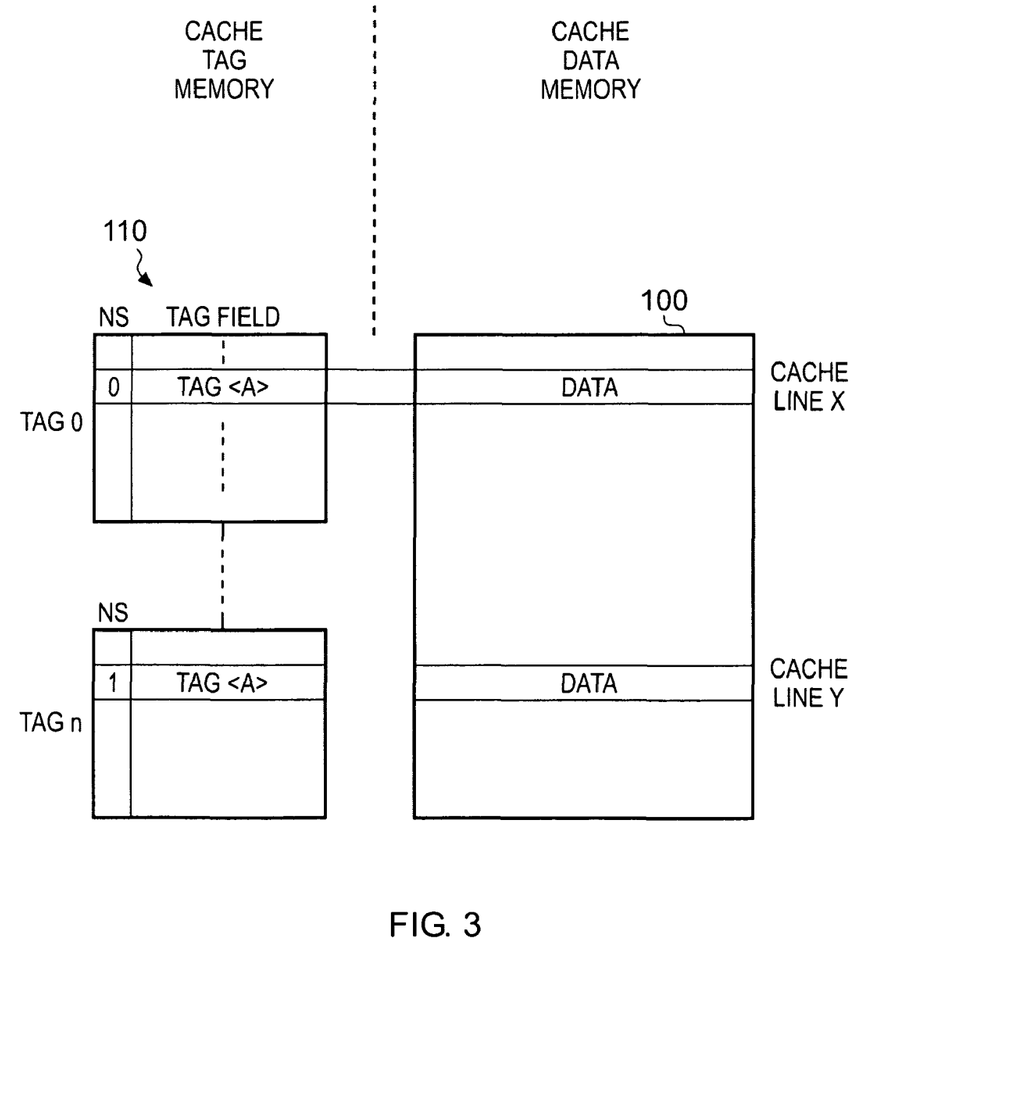
FIG. 3 illustrates in more detail the arrangement of the level 2 cache shown in FIG. 2.

FIG. 3 illustrates in more detail an arrangement of the cache 35. In particular, the optional arrangement of storing an indication of whether the data values stored in the cache 35 are secure or non-secure is illustrated.

The cache 35 comprises a data memory 100 and a tag memory 110. Each entry in the tag memory 110 is associated with corresponding cache line in the data memory 100. Each cache line contains a plurality of data values (in this example 4, 64-bit words).

When issuing a transfer request, the TAG portion issued by the level 1 processor core 20 has appended thereto the value of the prot[1] signal as a security attribute which indicates the security type associated with the request being made.

When accessing the cache 35, a controller (not shown) determines whether the TAG portion of a memory address and security attribute issued by the level 1 core 20 matches the tag (in combination with a security attribute bit) in any one of the tag entries of the tag memory 110. If a match is found then the data value in the corresponding cache line for that tag entry may be accessed in the cache 35.

As just mentioned, included in the tag entry of each cache line is a security attribute bit. The security attribute bit is appended to the tag entry in the tag memory. Hence, for any particular address value it will be appreciated that data values sharing the same address value can have separate tag entries, one for secure data values and one for non-secure data values.

Accordingly, for example, should a secure process cause a data value to be accessed in the cache 35, then the tag provided to the tag memory 110 will have a security attribute bit set at '0' (the value of the prot[1] signal) appended thereto. In the example shown in FIG. 3, a cache hit will occur and the data values stored at cache line 'X' will be accessed.

Conversely, should a non-secure process cause a data value to be accessed in the cache 35, then the tag provided to the tag memory 110 will have a security attribute bit set at '1' (the value of the prot[1] signal) appended thereto. In the example shown in FIG. 3, a cache hit will occur and the data values stored at cache line 'Y' will be accessed.

Hence, it will be appreciated that secure accesses can only access secure data in the cache 35 and non-secure accesses can only access non-secure data in the cache 35. Also, whilst FIG. 3 shows a single security attribute bit, it will be appreciated that a number of bits could instead be used.

In addition, for each tag entry, a number of status bits (not shown) are preferably provided for each cache line such as a valid bit and a dirty bit.

As will be appreciated by those skilled in the art, the valid bit is used to indicate whether a data value stored in the corresponding cache line is still considered valid or not. Hence, setting the valid bit will indicate that the corresponding data values are valid, whilst clearing the valid bit will indicate that at least one of the data values is no longer valid.

Further, as will be appreciated by those skilled in the art, the dirty bit is used to indicate whether any of the data values stored in the corresponding cache line are more up-to-date than the data values stored in the level three memory 40. The value of the dirty bit is relevant for write-back regions of memory, where a data value output by the level 1 core 20 and stored in the cache 35 is not immediately also passed to the level three memory 40 for storage, but rather the decision as to whether that data value should be passed to the level three memory 40 is taken at the time that the particular cache line is over written, or "evicted", from the cache 35. Accordingly, a dirty bit which is not set will indicate that the data value stored in the corresponding cache line corresponds to the data value stored in the level three memory 40, whilst a dirty bit being set will indicate that at least one of the data values stored in the corresponding cache line has been updated, and the updated data value has not yet been passed to the level three memory 40.

Typically, when the data values in the cache line are overwritten in the cache 35 they will be output to the level three memory 40 for storage if the valid and dirty bits indicate that the data values are both valid and dirty. If the data values are not valid, or are not dirty, then the data values can be overwritten without the requirement to pass the data values back to the level three memory 40.

Figure 4:
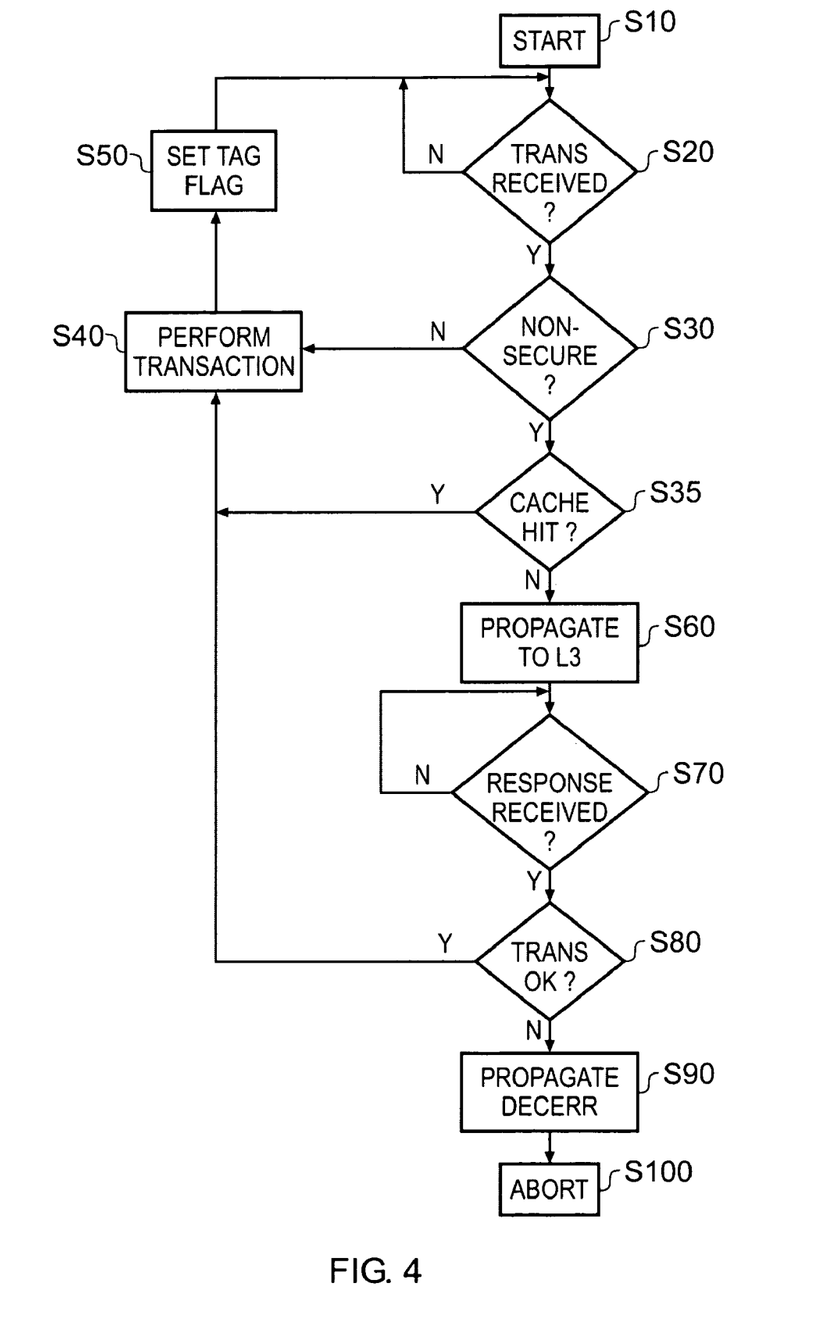
FIG. 4 is a flow-chart illustrating the operation of the level 2 memory system shown in FIG. 2.

FIG. 4 illustrates in more detail the operation of the level 2 memory 30 which utilises the security check and security attribute bits.

Processing Starts at Step s10.

At step s20, a determination is made as to whether a write data transfer request in the form of a write transaction has been received at the slave port 50. Once a write transaction is received then processing proceeds to step s30.

At step s30, a determination is made as to whether the write data access request is a secure or a non-secure data access request. This determination is made by referring to the prot[1] signal propagated from the level 1 core 20 to the slave port 50.

In the event that the prot[1] signal is not asserted (indicating that the level 1 core processor 20 is operating in a secure mode and that both secure and non-secure data values can be written by the level 1 core 20) then at step s40 the transaction is performed and at step s50 the security attribute bit in the tag memory 110 for that cache line is updated to indicate that the data values are secure data values.

In the event that at step s30 it is determined that the write data access request is a non-secure write data access request then processing proceeds to step s35.

At step s35, a determination is made as to whether a cache hit occurs in the cache 35. In the event that a cache hit does occur then processing proceeds to step s40 where the transaction is performed and at step s50 the security attribute bit in the tag memory 110 for that cache line is updated to indicate that the data values are secure data values. In the event that a cache hit does not occur then processing proceeds to step s60.

At step s60, a security check is made to the level three memory 40. The security check provides an indication of an address value associated with the write data access request together with a security attribute indicated by the prot[1] signal to the level three memory 40. This security check is in the form of a read from the level three memory 40, with the data values being used or discarded as appropriate. The level three memory 40 receives the address value and the prot[1] signal and will attempt to read that address value. Hence, the propagation at step s60 may be either initiated by the write buffer 70 prior to writing a cache line to the cache 35 whereby a dummy read is performed to the level three memory 40 for one of the addresses in that cache line. Alternatively, in the event that a complete cache line is not available to be written to the cache 35 then the write allocate buffer 80 will initiate a read to the level three memory 40 in order to obtain the missing data values. Again, the result of that read can be used to determine whether a data value can be accessed in that security mode. Whilst the above has been described with respect to accesses to the level three memory 40, as mentioned previously, page tables could be provided at level 2 and these could be used to perform the security check instead.

Processing proceeds to step s70 where a response from the level three memory 40 is awaited. Once a response is received then processing proceeds to step s80.

At step s80, a determination is made as to whether the write data access request has passed the security check and should be allowed to proceed.

In the event that, at step s80, the level three memory 40 determines that it is not possible to read the data value specified at that address value when the level 1 core 20 is in a mode indicated by the prot[1] signal, then the decerr signal is propagated to the level 2 memory 20 and processing proceeds to step s90.

At step s90, the decerr will be propagated by the master port 60 to the slave port 50 and onto the level 1 core 20.

At step s100, on receipt of the decerr signal from the level 2 cache 30 the level 1 core 20 will abort.

In the event that, at step s80, the level three memory 40 determines that the data access can occur in that security mode then processing proceeds to step s40 where the transaction is performed and at step s50 the security attribute bit in the tag memory 110 for that cache line is updated to indicate that the data values are secure data values.

Accordingly, the above techniques help to ensure that secure data is not inadvertently written to the cache 35 using a non-secure application executing on the level 1 core 20. Verifying that the non-secure write can take place and preventing the level 1 core 20 from issuing further data accesses whilst this verification is taking place ensures that any security violations are identified quickly. Identifying violations in this way overcomes the problem that would otherwise occur whereby data could be written and read from the cache 35 multiple times prior to being evicted whereupon the security violation would only then become apparent.

Although illustrative embodiments of the invention have been described herein with reference to the accompanying drawings, it is to be understood that the invention is not limited to those precise embodiments, and that various changes and modifications can be affected therein by one scope in the art without departing from the scope and spirit of the invention as defined by the appended claims.

We claim:

1. A data processing apparatus configured to access data values, each data value being associated with a respective address value, the data processing apparatus comprising:
    a processor configured to process an instruction which causes a data access request;
    a main memory configured to store data values, said main memory having a region of secure data values and comprising a data region allocation table, said data region allocation table being maintained by said main memory and providing an indication of whether regions of said main memory comprise secure data regions storing said secure data values or non-secure data regions;
    a cache configured to store previously accessed data values corresponding to both secure data and non-secure data, and
    cache interface logic comprising:
    data transaction logic configured to receive a data access request from said processor requesting a data value be accessed in said cache, said data access request having an address value and a security attribute associated therewith; and
    security determination logic configured, in the event that said security attribute indicates a non-secure data access request for data to be accessed in said cache, to determine whether said non-secure data access request is associated with said region of secure data values by interrogating said data region allocation table and, in the event that said data region allocation table provides an indication that said address value is not associated with said secure data region of said main memory, to enable said data access request to complete and access said data value in said cache.

2. The data processing apparatus as claimed in claim 1, wherein said security determination logic is configured to prevent said data access request from completing whilst said security determination logic determines whether said non-secure data access request is associated with said region of secure data values.

3. The data processing apparatus as claimed in claim 2, wherein said security determination logic is configured to signal said processor to indicate that a data access is outstanding in order to prevent said processor receiving a response for the access whilst said security determination logic determines whether said non-secure data access request is associated with said region of secure data values.

4. The data processing apparatus as claimed in claim 1, wherein said data access request is a request to write data to said cache and said security determination logic is configured, in the event that said security attribute indicates a non-secure write request, to determine whether said non-secure write request is associated with said region of secure data values and, in the event that said data region allocation table provides an indication that said address value is not associated with said region of secure data values, to enable said write request to complete.

5. The data processing apparatus as claimed in claim 4, wherein each data value is further associated with a security state indication and said security determination logic is further configured, in the event that said data region allocation table provides an indication that said address value is not associated with said region of secure data values, to set said security state indication associated with each data value the subject of said write request to indicate said data as being non-secure data values.

6. The data processing apparatus as claimed in claim 4, wherein said security determination logic is configured, in the event that said security attribute indicates a non-secure write request, to determine whether said non-secure write request is associated with said region of secure data values and, in the event that said data region allocation table provides an indication that said address value is associated with said region of secure data values, to prevent said write request from completing.

7. The data processing apparatus as claimed in claim 6, wherein said security determination logic is configured to prevent said data access from completing by signalling said processor to abort.

8. The data processing apparatus as claimed in claim 1, wherein said data access request is a request to write data to said cache, each data value is further associated with a security state indication and said security determination logic is configured, in the event that said security attribute indicates a secure write request to enable said write request to complete and to set said security state indication associated with each data value the subject of said write request to indicate said data as being secure data values.

9. The data processing apparatus as claimed in claim 1, wherein said security determination logic is configured to determine whether said address value is associated with said region of secure data values by providing a level three memory with said address value and said security attribute, said level three memory being configured to maintain said data region allocation table and to provide an indication of whether said address value is accessible with using a data access request having that security attribute.

10. The data processing apparatus as claimed in claim 9, wherein said level three memory is configured to maintain said data region allocation table to indicate those data regions accessible using secure and non-secure data access requests.

11. The data processing apparatus as claimed in claim 9, wherein said security determination logic is configured to determine whether said non-secure data access request is not associated with said region of secure data values by initiating a data access to said level three memory and providing said address value and said security attribute.

12. The data processing apparatus as claimed in claim 11, wherein said data access comprises one of a read and a write to said level three memory.

13. The data processing apparatus as claimed in claim 12, wherein said level three memory is configured to provide an access confirmation signal when said non-secure data access request is not associated with said region of secure data values and an access error signal when said non-secure data access request is associated with said region of secure data values.

14. The data processing apparatus as claimed in claim 11, wherein said data access comprises a linefill read from said level three memory.

15. The data processing apparatus as claimed in claim 1, further comprising said data region allocation table configured to provide an indication of whether said address value is accessible with using a data access request having that security attribute.

16. The data processing apparatus as claimed in claim 1, wherein said cache interface logic further comprises said data region allocation table configured to provide an indication of whether said address value is accessible with using a data access request having that security attribute.

17. The data processing apparatus as claimed in claim 1, further comprising a level one cache and wherein said cache is a level two cache.

18. A data processing apparatus for accessing data values, each data value being associated with a respective address value, said data processing apparatus comprising:
means for processing an instruction which causes a data access request;
means for storing data values, said means for storing having a region of secure data values and having a data region allocation means, said data region allocation means being maintained by said means for storing and providing an indication of whether regions of said means for storing comprise secure data regions storing said secure data values or non-secure data regions;
cache means for storing previously accessed data values corresponding to both secure data and non-secure data; and
cache interface means comprising:
means for receiving a data access request from said means for processing, said data access request requesting a data value be accessed in said cache means, said data access request having an address value and a security attribute associated therewith; and
means for determining, in the event that said security attribute indicates a non-secure data access request for data to be accessed in said cache, whether said non-secure data access request is associated with said region of secure data values by interrogating said data region allocation means and, in the event that said data region allocation means provides an indication that said address value is not associated with said secure data region of said means for storing, for enabling said data access request to complete and access said data value in said cache.

19. A method of accessing data values in data processing apparatus, each data value being associated with a respective address value, the data processing apparatus comprising a processor configured to process an instruction which causes a data access request, a main memory configured to store data values, said main memory having (1) a region of secure data values and comprising a data region allocation table, said data region allocation table being maintained by said main memory and providing an indication of whether regions of said main memory comprise secure data regions storing said secure data values or non-secure data regions and (2) a cache configured to store previously accessed data values corresponding to both secure data and non-secure data, said method comprising the steps of:

receiving a data access request from said processor requesting a data value be accessed in said cache, said data access request having an address value and a security attribute associated therewith;

in the event that said security attribute indicates a non-secure data access request for data to be accessed in said cache, determining whether said non-secure data access request is associated with said region of secure data values by interrogating said data region allocation table; and in the event that said data region allocation table provides an indication that said address value is not associated with said secure data region of said main memory, enabling said data access request to complete and access said data value in said cache.

\* \* \* \* \*